United States Patent
Hirsch et al.

(10) Patent No.: US 10,154,332 B2
(45) Date of Patent: Dec. 11, 2018

(54) POWER MANAGEMENT FOR WIRELESS EARPIECES UTILIZING SENSOR MEASUREMENTS

(71) Applicant: BRAGI GmbH, München (DE)

(72) Inventors: Eric Christian Hirsch, München (DE); Peter Vincent Boesen, München (DE); Matthias Lackus, München (DE); Martin Steiner, München (DE)

(73) Assignee: BRAGI GmbH, München (DE)

( * ) Notice: Subject to any disclaimer, the term of this patent is extended or adjusted under 35 U.S.C. 154(b) by 3 days.

(21) Appl. No.: 15/391,341

(22) Filed: Dec. 27, 2016

(65) Prior Publication Data

US 2017/0188132 A1    Jun. 29, 2017

Related U.S. Application Data

(60) Provisional application No. 62/272,363, filed on Dec. 29, 2015.

(51) Int. Cl.
| | |
|---|---|
| *H04R 1/10* | (2006.01) |
| *G01J 1/42* | (2006.01) |
| *G06F 1/32* | (2006.01) |
| *G10L 15/22* | (2006.01) |

(Continued)

(52) U.S. Cl.
CPC .......... *H04R 1/1041* (2013.01); *G01J 1/4204* (2013.01); *G06F 1/3206* (2013.01); *H04R 1/1016* (2013.01); *H04R 1/1025* (2013.01); *G06F 3/165* (2013.01); *G10L 15/22* (2013.01); *G10L 25/21* (2013.01); *H04R 2225/31* (2013.01); *H04R 2420/07* (2013.01); *H04R 2460/03* (2013.01)

(58) Field of Classification Search
CPC ... G01J 1/4204; H04R 1/1016; H04R 1/1025; H04R 29/001; H04R 2420/07; H04R 2420/09; H04R 2460/03; G06F 3/017; G06F 3/165; H10L 15/22
USPC .......................................................... 381/57
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| 4,334,315 A | 6/1982 | Ono et al. |

(Continued)

FOREIGN PATENT DOCUMENTS

| | | |
|---|---|---|
| EP | 1017252 A2 | 7/2000 |
| EP | 2903186 A1 | 8/2015 |

(Continued)

OTHER PUBLICATIONS

Announcing the $3,333,333 Stretch Goal (Feb. 24, 2014).

(Continued)

*Primary Examiner* — Quynh Nguyen
(74) *Attorney, Agent, or Firm* — Goodhue, Coleman & Owens, P.C.

(57) ABSTRACT

A system, method and wireless earpieces for managing power utilized by a pair of wireless earpieces. Ambient light conditions and noise levels in an environment of the pair of wireless earpieces are determined. The low power settings are activated for the pair of wireless earpieces in response to determining the ambient light conditions are below a light threshold or the noise levels are below a noise threshold; signal activity is below an activity threshold.

20 Claims, 4 Drawing Sheets

(51) Int. Cl.
*G06F 3/16* (2006.01)
*G10L 25/21* (2013.01)

(56) References Cited

U.S. PATENT DOCUMENTS

| | | |
|---|---|---|
| 4,375,016 A | 2/1983 | Harada |
| 4,588,867 A | 5/1986 | Konomi |
| 4,654,883 A | 3/1987 | Iwata |
| 4,682,180 A | 7/1987 | Gans |
| 4,791,673 A | 12/1988 | Schreiber |
| 4,865,044 A | 9/1989 | Wallace et al. |
| 5,191,602 A | 3/1993 | Regen et al. |
| 5,201,007 A | 4/1993 | Ward et al. |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,363,444 A | 11/1994 | Norris |
| 5,497,339 A | 3/1996 | Bernard |
| 5,606,621 A | 2/1997 | Reiter et al. |
| 5,613,222 A | 3/1997 | Guenther |
| 5,692,059 A | 11/1997 | Kruger |
| 5,721,783 A | 2/1998 | Anderson |
| 5,749,072 A | 5/1998 | Mazurkiewicz et al. |
| 5,771,438 A | 6/1998 | Palermo et al. |
| 5,802,167 A | 9/1998 | Hong |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,275,789 B1 | 8/2001 | Moser et al. |
| 6,339,754 B1 | 1/2002 | Flanagan et al. |
| 6,408,081 B1 | 6/2002 | Boesen |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| 7,463,902 B2 | 12/2008 | Boesen |
| 7,508,411 B2 | 3/2009 | Boesen |
| 7,983,628 B2 | 7/2011 | Boesen |
| 8,140,357 B1 | 3/2012 | Boesen |
| 8,798,289 B1* | 8/2014 | Every ..................... G06F 1/325 |
| | | 381/57 |
| 2001/0005197 A1 | 6/2001 | Mishra et al. |
| 2001/0027121 A1 | 10/2001 | Boesen |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2005/0270265 A1* | 12/2005 | Plut ..................... G06F 1/3218 |
| | | 345/102 |
| 2006/0029246 A1 | 2/2006 | Boesen |
| 2006/0074671 A1 | 4/2006 | Farmaner et al. |
| 2006/0074808 A1 | 4/2006 | Boesen |
| 2008/0075353 A1* | 3/2008 | Tek .................... G01N 21/4738 |
| | | 382/145 |
| 2008/0254780 A1 | 10/2008 | Kuhl et al. |
| 2009/0017881 A1 | 1/2009 | Madrigal |
| 2009/0262205 A1* | 10/2009 | Smith .................. H04N 5/2251 |
| | | 348/211.4 |
| 2009/0264161 A1* | 10/2009 | Usher ..................... H04M 1/22 |
| | | 455/570 |
| 2010/0320961 A1 | 12/2010 | Castillo et al. |
| 2011/0254691 A1* | 10/2011 | Ooi .......................... G09G 5/10 |
| | | 340/635 |
| 2011/0286615 A1 | 11/2011 | Olodort et al. |
| 2012/0166696 A1* | 6/2012 | Kallio ..................... H04M 1/67 |
| | | 710/260 |
| 2012/0264091 A1* | 10/2012 | Huber ................... G09B 19/04 |
| | | 434/185 |
| 2014/0270227 A1 | 9/2014 | Swanson |
| 2017/0230752 A1* | 8/2017 | Dohmen ................ H04R 5/033 |

FOREIGN PATENT DOCUMENTS

| | | |
|---|---|---|
| GB | 2074817 | 4/1981 |
| JP | 06292195 | 10/1998 |
| WO | 2014043179 A2 | 3/2014 |
| WO | 2015110577 A1 | 7/2015 |
| WO | 2015110587 A1 | 7/2015 |

OTHER PUBLICATIONS

BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From Apr.—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).

(56) References Cited

OTHER PUBLICATIONS

BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up Dec. 27, 2016.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, on Track and Gems Overview Dec. 27, 2016.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash-A Word From Our Software, Mechanical and Acoustics Team + An Update (Mar. 11, 2014).
Update From BRAGI—$3,000,000—Yipee (Mar. 22, 2014).

\* cited by examiner

POWER MANAGEMENT FOR WIRELESS EARPIECES UTILIZING SENSOR MEASUREMENTS

PRIORITY STATEMENT

This application claims priority to U.S. Provisional Patent Application 62/272,363, filed on Dec. 29, 2015, and entitled Power Management For Wireless Earpieces Utilizing Sensor Measurements, hereby incorporated by reference in its entirety.

BACKGROUND

I. Field of the Disclosure

The illustrative embodiments relate to wireless earpieces. More specifically, but not exclusively, the illustrative embodiments relate to managing power settings for wireless earpieces utilizing sensor measurements including ambient light detection.

II. Description of the Art

The growth of wearable devices is increasing exponentially. This growth is fostered by the decreasing size of microprocessors, circuitry boards, chips, and other components. Wearable devices are necessarily dependent upon their batteries in order to complete their desired function. The overall utility of wearable devices is directly proportional to the battery life of the devices. If the battery life is poor, the user interface and user experiences suffers as too much time and attention are required for retrieving the device, recharging or replacing the battery, and repositioning the wearable device. Operation and conservation of the battery life of the wearable device may be further complicated if the device is unable to properly conserve power based on changing environments and circumstances.

SUMMARY OF THE DISCLOSURE

One embodiment of the illustrative embodiments provides a system, method and wireless earpieces for managing power utilized by a pair of wireless earpieces. Ambient light conditions and noise levels in an environment of the pair of wireless earpieces are determined. The low power settings are activated for the pair of wireless earpieces in response to determining the ambient light conditions are below a light threshold or the noise levels are below a noise threshold; signal activity is below an activity threshold. Another embodiment provides wireless earpieces including a processor and a memory storing a set of instructions. The set of instructions are executed to perform the method described.

Another embodiment provides a wireless earpiece. The wireless earpiece includes a frame for fitting in an ear of a user. The wireless earpiece includes a logic engine controlling functionality of the wireless earpiece. The wireless earpiece includes a speaker in communication with the logic engine communicating audio signals to the user. The wireless earpiece includes a number of sensors sensing ambient light conditions and noise levels in an environment of the wireless earpiece. The wireless earpieces includes a transceiver communicating with at least a wireless device. The logic activates a low power setting for the wireless earpieces in response to determining the ambient light conditions are below a light threshold or the noise levels are below a noise threshold.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE DISCLOSURE

Figure 1:
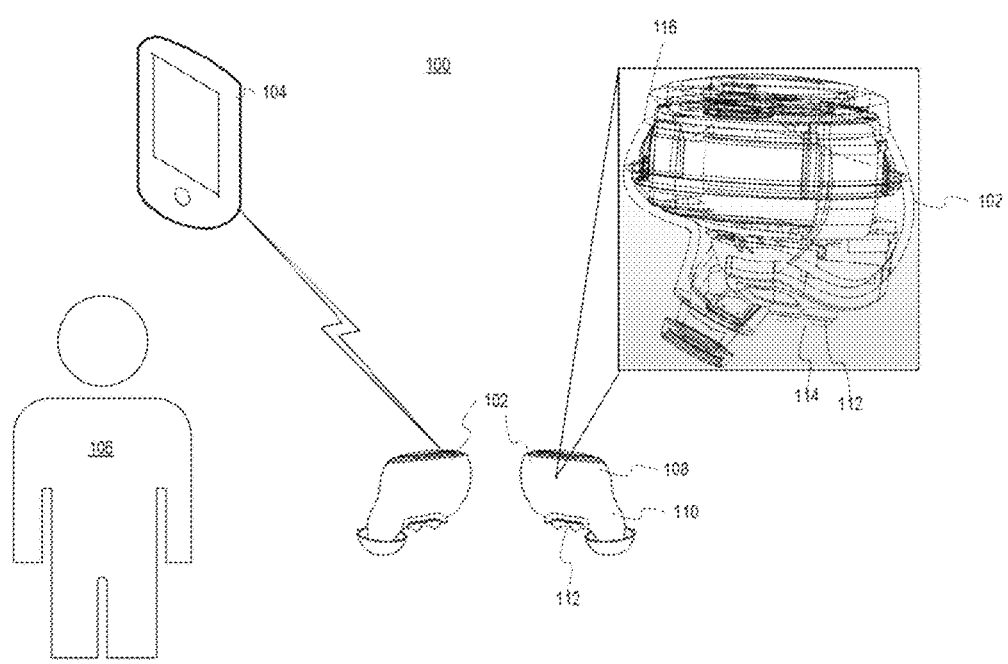
FIG. 1 is a pictorial representation of a wireless environment in accordance with an illustrative embodiment.

The illustrative embodiments provide a system, method, and wireless earpieces configured to manage power utilization. In one embodiment, the wireless earpieces may adjust the power settings based on sensor measurements taken by the wireless earpieces. For example, low light or low noise environments may represent conditions during which low power settings may be utilized to drive, the speakers, microphone, logic, and functionality of the wireless earpieces. Likewise, fully lit and/or noisy environments may represent conditions during which full power or default settings may be utilized.

The wireless earpieces may utilize low power settings to preserve battery life. As a result, the power capacity of the wireless earpieces may be optimized for maximum efficiency to extract the longest possible functional time. Preserving the battery life of the wireless earpieces is particularly important because of the reduced size of the wireless earpieces and limited available space for the battery. In addition, the wireless earpieces may become particularly important to a user for business, exercise, or personal activities and, therefore, merits preserving power whenever possible to optimize the user's experience.

Any number of conditions, factors, and so forth sensed by a sensor array of the wireless earpieces may be utilized to determine whether the wireless earpieces should enter a low power, sleep, hibernation, or other reduced power mode, status, or configuration. In one embodiment, the 1) ambient light conditions detected by the wireless earpieces and/or 2) ambient noise detected by the wireless earpieces and/or other interconnected devices may be utilized to determine whether low power settings should be utilized. The wireless earpieces may also utilize motion of the wireless earpieces to determine whether the low power settings should be implemented. As part of the power settings, the wireless earpieces may adjust the speaker output and the processing levels performed by wireless earpieces. The wireless earpieces may consistently and dynamically adjust the power settings. The adjustments made by the wireless earpieces may be overridden based on input, feedback, or commands received from the user. For example, even if the volume of the wireless earpiece is reduced based on low ambient light, the user may increase the volume to any desired level.

In other embodiments, the signal activity between a matched pair of wireless earpieces may be utilized to determine whether the wireless earpieces should utilize low power settings. In one embodiment, the wireless earpieces may implement low power settings in response to a lack of activity (e.g., playing music, selection for blocking noise, communicating voice signals for communication, etc.). In one embodiment, the wireless earpieces may enter a low power mode jointly. For example, if signal activity or other activity for the wireless earpieces is not determined or detected for a predetermined time period, such as three minutes, both of the wireless earpieces may implement low power settings. Alternatively, if one wireless earpiece implements low power settings, a command may be sent to the other wireless earpiece, if in range, to also utilize the low power settings. The determinations of signal activity may also be made by individual wireless earpieces in the event that they are being utilized alone rather than as a pair.

FIG. 1 is a pictorial representation of a wireless environment 100 in accordance with an illustrative embodiment. The wireless earpieces 102 may be configured to communicate with each other and with one or more wireless devices, such as a wireless device 104. The wireless earpieces 102 may be worn by a user 106 and are shown separately from their positioning within the ears of the user 106 for purposes of visualization. A block diagram of the wireless earpieces 102 if further shown in FIG. 2 to further illustrate components and operation oldie wireless earpieces 102.

In one embodiment, the wireless earpieces 102 includes a frame 108 shaped to fit substantially within the ears of the user 106. The frame 108 is a support structure that at least partially encloses and houses the electronic components of the wireless earpieces 102. The frame 108 may be composed of a single structure or multiple structures that are interconnected. The frame 108 defines an extension 110 configured to fit substantially within the ear of the user 106. An end of the extension 110 may include one or more speakers configured to deliver audio content to the user 106. The extension 110 may be removable covered by one or more sleeves. The sleeves may be changed to fit the size and shape of the user's ears. The sleeves may come in various sizes and have extremely tight tolerances to fit the user 106 and one or more other users that may utilize the wireless earpieces 102 during their expected lifecycle.

In another embodiment, the sleeves may be custom configured to support the interference fit utilized by the wireless earpieces 102 while also being comfortable while worn. In one embodiment, the frame 108 or the extension 110 (or other portions of the wireless earpieces 102) may include sensors 112 for sensing pulse, blood oxygenation, temperature, glucose levels, impacts, activity level, position, location, orientation, as well as any number of internal or external user biometrics. The sensors 112 may also detect external conditions, such as ambient light and ambient noise in the wireless environment 100. For example, one or more external photodetectors/imaging devices or microphones may detect such conditions. In Other embodiments, the sensors 112 may be internally positioned within the wireless earpieces 102. For example, the sensors 112 may represent metallic contacts, optical interfaces, or micro-delivery systems for receiving and delivering information. Small electrical charges may be passed through the sensors 112 to analyze the biometrics of the user 106 including pulse, blood analysis, sweat levels, band so forth. Sensors 112 may also be utilized to provide a small electrical current which may be useful for alerting the user, stimulating blood flow, alleviating nausea, or so forth.

In some applications, temporary adhesives or securing mechanisms (e.g., clamps, straps, extenders, etc.) may be utilized to ensure that the wireless earpieces 102 remain in the ears of the user 106 even during the most rigorous and physical activities. For example, the wireless earpieces 102 may be utilized during marathons, swimming, team sports, biking, hiking, parachuting, or so forth. The wireless earpieces 102 may be configured to play music or audio, receive and make phone calls or other communications, determine ambient environmental conditions (e.g., light, noise, temperature, altitude, location, speed, heading, etc.), read user biometrics (e.g., heart rate, motion, temperature, sleep, blood oxygenation, voice output, calories burned, forces experienced, etc.), and receive user input, feedback, or instructions. In some embodiments, the wireless earpieces 102 may be utilized to specifically monitor the condition in the wireless environment 100 to adjust the power settings of the wireless earpieces 102.

The wireless earpieces 102 may determine their position with respect to each other as well as the wireless device 104. For example, position information for the wireless earpieces 102 and the wireless device 104 may determine proximity of the devices in the wireless environment 100. For example, global positioning information or signal strength/activity may be utilized to determine proximity and distance of the devices to each other in the wireless environment 100. In one embodiment, the distance information may be utilized to determine devices available to receive communications from the wireless earpieces. The distance information may also be utilized to determine whether the wireless earpieces should utilize low power settings. For example, in response to detecting the wireless earpieces 102 are separated by a threshold distance and are not being worn by the user 106 (e.g., detected by contact season of the wireless earpieces 102), the wireless earpieces 102 may shut down or implement low power settings to preserve battery life.

In one embodiment, the wireless earpieces 102 and the corresponding sensors 112 (whether internal or external) may be configured to take a number of measurements or log information during normal usage. The sensor measurements may be utilized, to extrapolate other measurements, factors, or conditions applicable to the wireless earpieces or user 106. The user 106 or another party may configure the wireless earpieces 102 directly or through a connected device and app (e.g., mobile app with a graphical user interface) to adjust settings or store or share information, audio, images, and other data. Some examples of standard usage may include detecting and recording a heartbeat, active participation in a conversation, listening to music, or so forth.

In one embodiment, the wireless earpieces 102 may learn to reduce the power settings based on historical information or secondary verification. For example, the wireless earpieces 102 may alert the user 106 when the wireless earpieces 102 are implementing low power settings. The user 106 may verify that the implementation of the power settings is accurate. As a result, the power saving logic utilized by the wireless earpieces 102 may become more accurate over time. The user 106 or another party may also utilize the wireless device 104 to associate biometric information and ambient conditions with the implemented power state. As a result, the wireless earpieces 102 may be adjusted or trained over time to become even more accurate in dynamically conserving battery life. The wireless earpieces 102 may utilize historical information to generate thresholds, policies, or conditions, for determining when and how the determination to implement power settings are made and then executed.

The wireless earpieces 102 may include any number of sensors 112 and logic for measuring and determining user biometrics, such as pulse rate, blood oxygenation, temperature, calories expended, voice and audio output, position, and orientation (e.g., body, head, etc.). The sensors 112 may also determine the ambient light, ambient noise, user's location, position, velocity, impact levels, and so forth. The sensors 112 may also receive user input and convert the user input into commands or selections made across the personal devices of the personal area network. For example, the user input detected by the wireless earpieces 102 may include voice commands, head motions, finger taps, linger swipes, motions or gestures, or other user inputs sensed by the wireless earpieces. The user input may be determined by the wireless earpieces 102 and converted into commands that may be sent to one or more external devices, such as the wireless device 104, a tablet computer, or so forth.

The sensors 112 may make all of the measurements about the user 106 or may communicate with any number of other sensory devices in the wireless environment 100 to measure information and data about the user 106 as well as the wireless environment 100 itself. In one embodiment, the wireless environment 100 may represent all or a portion of a personal area network. The wireless earpieces 102 may be utilized to control, communicate, manage, or interact with a number of other wearable devices or electronics, such as smart glasses, helmets, smart glass, watches or wrist bands, other wireless earpieces, chest straps, implants, displays, clothing, or so forth. A personal area network is a network for data transmissions among devices, such as personal computing, communications, camera, vehicles, entertainment, and medical devices. The personal area network may utilize any number of wired, wireless, or hybrid configurations and may be stationary or dynamic. For example, the personal area network may utilize wireless network protocols or standards, such as INSTEON, IrDA, Wireless USB, Bluetooth, Z-Wave, ZigBee, Wi-Fi, ANT+ or other applicable radio frequency signals. In one embodiment, the personal area network may move with the user 106.

In other embodiments, the wireless environment 100 may include any number of devices, components, or so forth that may communicate with each other directly or indirectly through a wireless (or wired) connection, signal, or link. The wireless environment 100 may include one or more networks and network components and devices (not shown), such as routers, servers, signal extenders, intelligent network devices, computing devices, or so forth. In one embodiment, the network of the wireless environment 100 represents a personal area network as previously disclosed.

Communications within the wireless environment 100 may occur through the network or may occur directly between devices, such as the wireless earpieces 102 and the wireless device 104, or indirectly through a network, such as a Wi-Fi network. In one embodiment, the wireless environment 100 may communicate with or include a wireless network, such as as Wi-Fi, cellular (e.g., 3G, 4G, 5G, PCS, GSM, etc.), Bluetooth, or other short range or long range radio frequency network. The wireless environment 100 may also communicate with any number of hard wired networks, such as local area networks, coaxial networks, fiber-optic networks, network adapters, or so forth, Communications within the wireless environment 100 may be operated by one or more users, service providers, or network providers.

The wireless earpieces 102 may communicate, play, or utilize any number of alerts or communications to indicate the power state or change in power state to the user 106, In one embodiment, the status information may be determined utilizing measurements made by the sensors 112 as well as data extrapolated from the sensor measurements. For example, an alert may be played audibly to the user 106 indicating "a reduced power setting is being used" based on the sensor data that is applicable to the situation (e.g., noise level, ambient light, etc.). The wireless earpieces 102 may further indicate "the speaker volume is being lowered to save power." The wireless earpieces 102 may also play an alert indicating that the wireless earpieces 102 are increasing the power setting based on the environmental conditions (e.g., increased light and noise levels).

In other embodiments, the wireless earpieces 102 may also vibrate, flash, play a tone or other sound, or give other indications of the power setting. The wireless earpieces 102 may also communicate an alert to the wireless device 104 that shows up as a notification, message, or other indicator indicating the changed status of the power settings.

The wireless earpieces 102 as well as the wireless device 104 may include logic for automatically implementing power settings and power control measures. The wireless device 103 may include an application that displays instructions and information to the user 106 in response to changes in the power settings or associated actions.

In one embodiment, the wireless device 104 may utilize short-range or long-range wireless communications to communicate with the wireless earpieces 102 through a wireless signal or devices of the wireless environment 100. For example, the wireless device 104 may include a Bluetooth and cellular transceiver within the embedded logical components. For example, the wireless signal may be a Bluetooth, Zigbee, Ant+, or other short range wireless communication.

The wireless device 104 may represent any number of wireless or wired electronic communications or computing devices, such as smart phones, laptops, desktop computers, control systems, tablets, displays, gaming devices, music players, personal digital assistants, vehicle systems, or so forth. The wireless device 104 may communicate utilizing any number of wireless connections, standards, or protocols (e.g., near field communications, Bluetooth, Wi-Fi, wireless Ethernet, etc.). For example, the wireless device 104 may be a touch screen cellular phone that communicates with the wireless earpieces 102 utilizing Bluetooth communications. The wireless device 104 may implement and utilize any number of operating systems, kernels, instructions, or applications that may make use of the available sensor data sent from the wireless earpieces 102. For example, the wireless device 104 may represent any number of android, iOS. Windows, open platforms, or other systems and devices. Similarly, the wireless device 104 or the wireless earpieces 102 may execute any number of applications that utilize the user input, proximity data, biometric data, and other feedback from the wireless earpieces 102 to determine the user status, tune, adjust, or bias sensor measurements, share applicable information and data, control the applications, play audible or tactile alerts, or make other selections.

Figure 2:
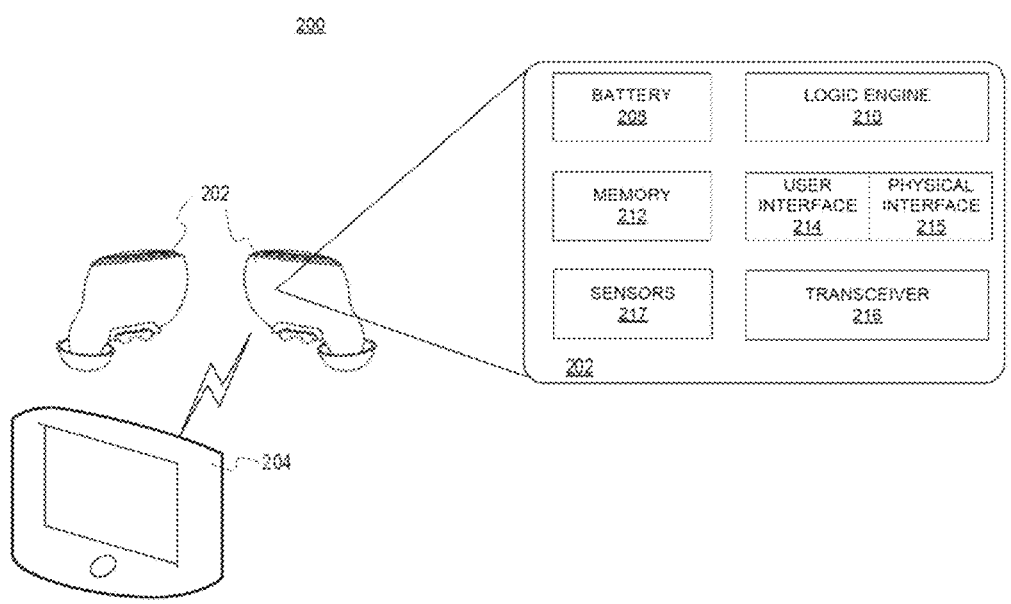
FIG. 2 is a block diagram of wireless earpieces in accordance with an illustrative embodiment.

FIG. 2 is a block diagram of a wireless earpiece system 200 in accordance with an illustrative embodiment. In one embodiment, the wireless earpiece system 200 may include wireless earpieces 202 (described collectively rather than individually). In one embodiment, the wireless earpiece system 201) may enhance communications and functionality of the wireless earpieces 202.

As shown, the wireless earpieces 202 may be wirelessly linked to a computing device 204, For example, the computing device 204 may represent a wireless tablet computer. User input and commands may be received from either of the wireless earpieces 202 or the computing, device 204 for implementation on either of the devices of the wireless earpiece system 200 (or other externally connected devices).

As previously noted, the wireless earpieces 202 may be referred to or described herein as a pair (wireless earpieces) or singularly (wireless earpiece). The description may also refer to components and functionality of each of the wireless earpieces 202 collectively or individually.

In some embodiments, the computing device 204 may act as a logging tool for receiving information, data, or measurements made by the wireless earpieces 202. For example, the computing; device 204 may download data from the wireless earpieces 202 in real-time. As a result, the computing device 204 may be utilized to store, display, and synchronize data for the wireless earpieces 202. For example, the computing device 204 may display pulse, proximity, location, oxygenation, distance, calories burned, and so forth as measured by the wireless earpieces 202. The computing device 204 may be configured to receive and display alerts that indicate conditions to utilize low power settings have been met. For example, if the wireless earpieces 202 detects the ambient light conditions or the noise level are below a threshold, the wireless earpieces 202 may utilize the low power settings and generate a message to the computing device 204 indicating the wireless earpieces 202 have entered the low power mode and are using the associated low power settings. The wireless earpieces 202 and the computing device 204 may have any number of electrical configurations, shapes, and colors and may include various circuitry, connections, and other components.

In one embodiment, the wireless earpieces 202 may include a battery 208, a logic engine 210, a memory 212, a user interface 214, a physical interface 215, a transceiver 216, and sensors 217. The computing device 204 may have any number of configurations and include components and features as are known in the art.

The battery 208 is a power storage device configured to power the wireless earpieces 202. Likewise, the battery 218 is a power storage device configured to power the computing device 204. In other embodiments, the battery 208 may represent a fuel cell, thermal electric generator, piezo electric charger, solar charger, ultra-capacitor, or other existing or developing power storage technologies. The illustrative embodiments preserve the capacity of the battery 208 by reducing unnecessary utilization of the wireless earpieces 202 in a full-power mode when there is little or no benefit to the user (e.g., the wireless earpieces 202 are being utilized in a low noise environment). Likewise, the wireless earpieces 202 may increase the power or sensitivity or photodetectors within the sensors 217 in response to determining the wireless earpieces 202 are being utilized in a low light environment.

The logic engine 210 is the logic that controls the operation and functionality of the wireless earpieces 202. The logic engine 210 may include circuitry, chips, and other digital logic. The logic engine 210 may also include programs, scripts, and instructions that may be implemented to operate the logic engine 210. The logic engine 210 may represent hardware, software, firmware, or any combination thereof. In one embodiment, the logic engine 210 may include one or more processors. The logic engine 210 may also represent an application specific integrated circuit (ASIC) or field programmable gate array (FPGA). The logic engine 210 may utilize the ambient and user conditions sensed by the sensors 217 to adjust the power level and settings utilized by the components of the wireless earpieces 202. For example, in response to determine there is a low light environment, the logic engine 210 may increase the power to an infrared detection system that is integrated with the user interface 214 while decreasing the volume of the one or more speakers that are part of the user interface 214. The logic engine may also utilize proximity of the wireless earpieces 202 and signal activity to determine whether the components of the wireless earpieces 202 are being utilized and what power level for the overall wireless earpieces 202 or individual components is appropriate. For example, the logic engine 210 may also determine whether the wireless earpieces 202 are actively performing any user-requested functions that indicate the wireless earpieces 202 are active. For example, the logic engine may determine whether music is being played, communications being received, processed, or sent, noise-cancellation is being performed and so forth. Activity as well as the user and ambient conditions may be utilized to adjust the power level settings, mode, and configuration. Utilizing the ambient and user information and signal activity, the logic engine 210 may provide instructions to utilize low power settings. In one embodiment, the logic engine 210 may turn off or reduce power to most of the components of the wireless earpieces. If user feedback or communications are detected or received, the logic engine 210 may wake up or power up all or portions of the wireless earpieces 202 from the low power mode to a regular or full-power mode. The wireless earpieces 202 may be configured to work together or completely independently based on the needs of the user.

The logic engine 210 may also process user input to determine commands implemented by the wireless earpieces 202 or sent to the wireless earpieces 204 through the transceiver 216. Specific actions may be associated with proximity thresholds. For example, the logic engine 210 may implement a macro allowing the user to associate ambient data with specific power settings or modes of operation, such as normal operations for when the wireless earpieces 202 are positioned within the ears of the user with detected daylight or low power settings or modes when the wireless earpieces 202 are not being utilized in low light environments or low noise environments. Additionally, the power settings including speaker volumes may be increased (e.g., high power mode) in response to detecting a high noise environment. The sensitivity of the sensors 217 and user interface 214 may also be adjusted based on the sensed environment and conditions to enhance optimal operation and battery utilization.

In one embodiment, a processor included in the logic engine 210 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks.

The memory 212 is a hardware element, device, or recording media configured to store data or instructions for subsequent retrieval or access at a later time. The memory 212 may represent static or dynamic memory. The memory 212 may include a hard disk, random access memory, cache, removable media drive, mass storage, or configuration suitable as storage for data, instructions, and information. In one embodiment, the memory 212 and the logic engine 210 may be integrated. The memory may use any type of volatile or non-volatile storage techniques and mediums. The memory 212 may store information related to the status or condition of the ambient, a user, wireless earpieces 202, computing device 204, and other peripherals, such as a wireless device, smart glasses, smart watch, smart case for the wireless earpieces 202, wearable device, and so forth. In one embodiment, the memory 212 may display instructions, programs, drivers, or an operating system for controlling the user interface 214 including one or more LEDs or other light emitting components, microphones, speakers, tactile generators (e.g., vibrator), and so forth. The memory 212 may also store thresholds (e.g., default, user defined, etc.), conditions, signal or processing activity, proximity data, and so forth.

The transceiver 216 is a component comprising both a transmitter and receiver which may be combined and share common circuitry on a single housing. The transceiver 216 may communicate utilizing Bluetooth, Wi-Fi, ZigBee, Ant+, near field communications, wireless USB, infrared, mobile body area networks, ultra-wideband communications, cellular (e.g. 3G, 4G, 5G, PCS, GSM, etc.), infrared, or other suitable radio frequency standards, networks, protocols, or communications. The transceiver 216 may also be a hybrid transceiver that supports a number of different communications. For example, the transceiver 216 may communicate with the computing device 204 or other systems utilizing wired interfaces (e.g., wires, traces, etc.), NFC or Bluetooth communications.

The components of the wireless earpieces 202 may be electrically connected utilizing any number of wires, contact points, leads, busses, wireless interfaces, or so forth. In addition, the wireless earpieces 202 may include any number of computing and communications components, devices or elements which may include busses, motherboards, circuits, chips, sensors, ports, interfaces, cards, converters, adapters, connections, transceivers, displays, antennas, and other similar components. The physical interface 215 is hardware interface of the wireless earpieces 202 for connecting and communicating with the computing device 204 or other electrical components, devices, or systems.

The physical interface 215 may include any number of pins, arms, or connectors for electrically interfacing with the contacts or other interface components of external devices or other charging or synchronization devices. For example, the physical interface 215 may be a micro USB port. In one embodiment, the physical interface 215 is a magnetic interface that automatically couples to contacts or an interface of the computing device 204, In another embodiment, the physical interface 215 may include a wireless inductor for charging the wireless earpieces 202 without a physical connection to a charging device.

The user interface 214 is a hardware interface for receiving commands, instructions, or input through the touch (haptics) of the user, voice commands, or predefined motions. The user interface 214 may be utilized to control the other functions of the wireless earpieces 202. The user interface 214 may include the LED array, one or more touch sensitive buttons or portions, a miniature screen or display, or other input/output components. The user interface 214 may be controlled by the user or based on commands received from the computing device 204 or a linked wireless device. For example, the user may turn on, reactivate, or provide feedback utilizing the user interface 214. The user interface 214 may also include one or more microphones and speakers for receiving and communicating audio content.

In one embodiment, the user may provide feedback by tapping the user interface 214 once, twice, three times, or any number of times. Similarly, a swiping motion may be utilized across or in front of the user interface 214 (e.g., the exterior surface of the wireless earpieces 202) to implement a predefined action. Swiping motions read by an infrared sensor of the user interface 214 based on any number of directions or gestures may be associated with specific activities, such as play music, pause, fast forward, rewind, activate a digital assistant (e.g., Siri, Cortana, smart assistant, etc.). The swiping motions may also be utilized to control actions and functionality of the computing device 204 or other external devices (e.g., smart television, camera array, smart watch, etc.). The user may also provide user input by moving his head in a particular direction or motion or based on the user's position or location. For example, the user may utilize voice commands, head gestures, or touch commands to change the content displayed by the computing device 204. The user interface 214 may also provide a software interface including any number of icons, soft buttons, windows, links, programmable components, graphical display elements, and so forth.

The sensors 217 may include pulse oximeters, accelerometers, gyroscopes, magnetometers, inertial sensors, photoflight detectors, miniature cameras, microphones, and other similar instruments for detecting location, utilization, orientation, motion, and so forth. The sensors 217 may also be utilized to determine whether the wireless earpieces 202 are being actively utilized. The sensors 217 may provide measurements or data that may be utilized to select, activate, or utilize low power settings. For example, the light sensors and microphones within the sensors 217 may determine the ambient light conditions and ambient noise levels.

The computing device 204 may include components similar in structure and functionality to those shown for the wireless earpieces 202. The computing device may include any number of processors, batteries, memories, busses, motherboards, chips, transceivers, peripherals, sensors, displays, cards, ports, adapters, interconnects, sensors, and so forth. In one embodiment, the computing device 204 may include one or more processors and memories for storing instructions. The instructions may be executed as part of an operating system, application, browser, or so forth to implement the features herein described. In one embodiment, the wireless earpieces 202 may be magnetically or physically coupled to the computing device 204 to be recharged or synchronized or to be stored.

The computing device 204 may also execute an application with settings or conditions for utilizing low power settings. The user may adjust and program the settings including thresholds, activities, conditions, environmental factors, and so forth. In another embodiment, the computing device 204 may also include sensors for detecting the light conditions, noise levels, location, orientation, and proximity of the wireless earpieces 202 to the computing device 204. The wireless earpieces 202 may turn off communications to the computing device 204 in response to losing a status or heart beat connection to preserve battery life and may only periodically search for a connection, link, or signal to the computing device 204.

As originally packaged, the wireless earpieces 202 and the computing device 204 may include peripheral devices such as charging cords, power adapters, inductive charging adapters, solar cells, batteries, lanyards, additional light arrays, speakers, smart case covers, transceivers (e.g., cellular, etc.), or so forth. In one embodiment, the wireless earpieces 202 may include a smart case (not shown). The smart case may include an interface for charging the wireless earpieces 202 from an internal battery. The smart case may also include components similar to those described for the wireless earpieces 202 and utilize the interface or a wireless transceiver to log utilization, biometric information of the user, and other information and data.

Figure 3:
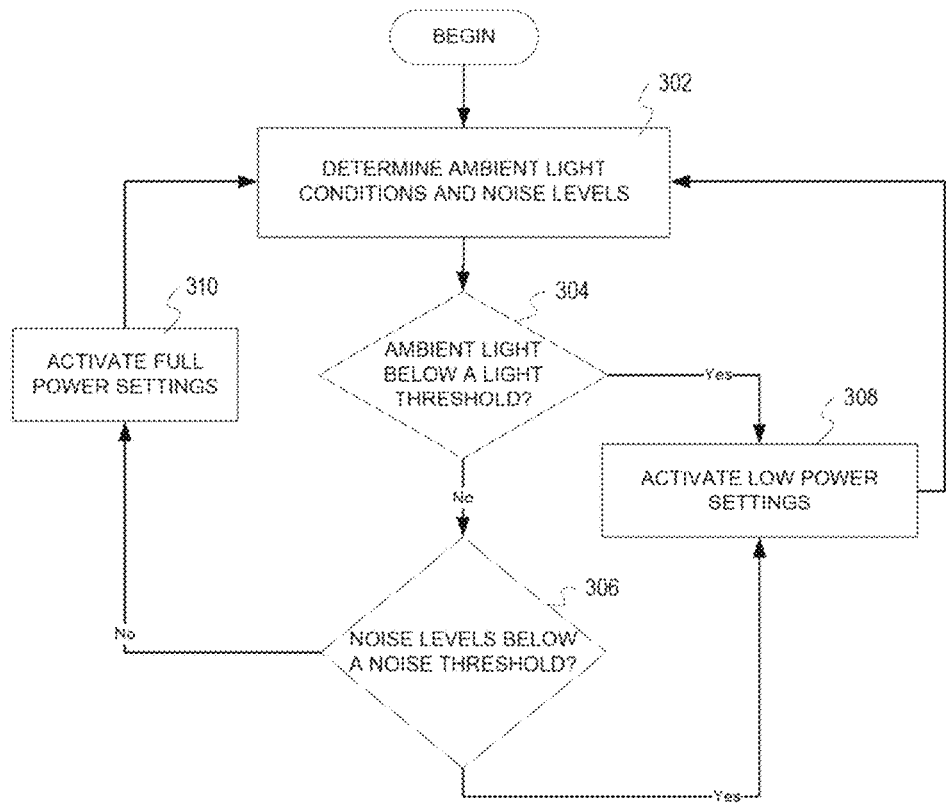
FIG. 3 is a flowchart of a process for managing, power utilization of wireless earpieces in accordance with an illustrative embodiment.

FIG. 3 is a flowchart of a process for managing power utilization of wireless earpieces in accordance with an illustrative embodiment. The process of FIG. 3 may be implemented by one or more wireless earpieces individually or collectively, wearable devices, and any number of other devices communicating directly or through a personal area network or other network.

In one embodiment, the process of FIG. 3 may begin by determining ambient light conditions and noise levels (step 302). The ambient light conditions may be determined utilizing an exterior image component, camera, or photo sensor. The noise levels may be determined by one or more microphones.

The wireless earpieces may be linked with each other (and with other electronic devices) utilizing any number of communications, standards, or protocols. For example, the devices may be linked by a Bluetooth connection. The process may require that the devices be paired utilizing an identifier, such as a passcode, password, serial number, voice identifier, radio frequency, or so forth. In one embodiment, a matched pair of wireless earpieces may be automatically linked for utilization by a single user when manufactured and delivered. The wireless earpieces may be linked with the communications device and any number of other devices directly or through a network, such as a personal area network. Sensors of a wireless device may also communicate information and data regarding ambient light conditions and noise levels.

Next, the wireless earpieces determine whether the ambient light is below a light threshold (step 304). The ambient light may be compared against a baseline or light threshold level to determine whether the light is considered to be normal high car low. In one embodiment, the threshold may be set by default. The light threshold may also be learned over time utilizing historical information. In one embodiment, the user may specify ambient light levels to associate with specific power settings. The light threshold may represent one or more thresholds, levels, or so forth.

In response to determining the ambient light is below a light threshold, the wireless earpieces activates low power settings (step 308). The low power settings may be activated for one or both of the wireless earpieces. For example, both of the wireless earpieces may enter a low power state to preserve battery capacity. The low power settings may include reducing the speaker volume or levels. The low power settings may also include reducing certain functions or power to components, such as sensor measurements, status communications, light displays, or so forth. In another example, the user may opt to only use one wireless earpiece at a time (e.g., left wireless earpiece) out of convenience, to increase battery life, or for any number of other reasons. As a result, the left wireless earpiece may remain in an active mode as utilized by the user and the right wireless earpiece may utilize low power settings. The wireless earpiece(s) may utilize the low power settings until otherwise activated in response to ambient light, noise levels, or user feedback. In one embodiment, the signal activity may activate full power settings (step 310) in response determining ambient light conditions are not below a threshold (e.g., above the threshold). Next, the wireless earpieces may return to determine the ambient light conditions and noise levels (step 302).

In response to determining the ambient light is not below a light threshold, the wireless earpieces determine whether noise levels are below a noise threshold (step 306). The noise levels may indicate the noise and sounds levels in the user's environment where the wireless earpieces are being utilized. For example, if the noise levels are below a noise threshold, the wireless earpieces may be in a low noise environment that merits utilizing the low power settings, such as speaker output levels in dB. Likewise, high noise environments may require full power, normal, or default settings to effectively communicate with the users.

If the wireless earpieces determine the noise levels are below the noise threshold, the wireless earpieces activate low power settings (step 308). The low power settings are activated to preserve the battery life because the wireless earpieces may be in a low noise environment. The low power settings may also be activated in response to detecting motion (e.g., accelerometers, gyroscopes, etc.). The low power settings may also be activated based on signal strength and signal activity between the wireless earpieces If the noise levels are not below the threshold in step 306, the wireless earpieces activates full power settings (step 310). If the wireless earpieces are already utilizing default, normal, or full power settings, the wireless earpieces continue to use the full power settings. If the wireless earpieces have been utilizing low power settings, the wireless earpieces may engage the various components or circuits and implement the corresponding instructions to utilize the full power settings. Next, the wireless earpieces return again to step 302.

The illustrative embodiments provide a system, method, personal area network, and wireless earpieces for managing the power settings used by the wireless earpieces individually or collectively. The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Jaya, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 4:
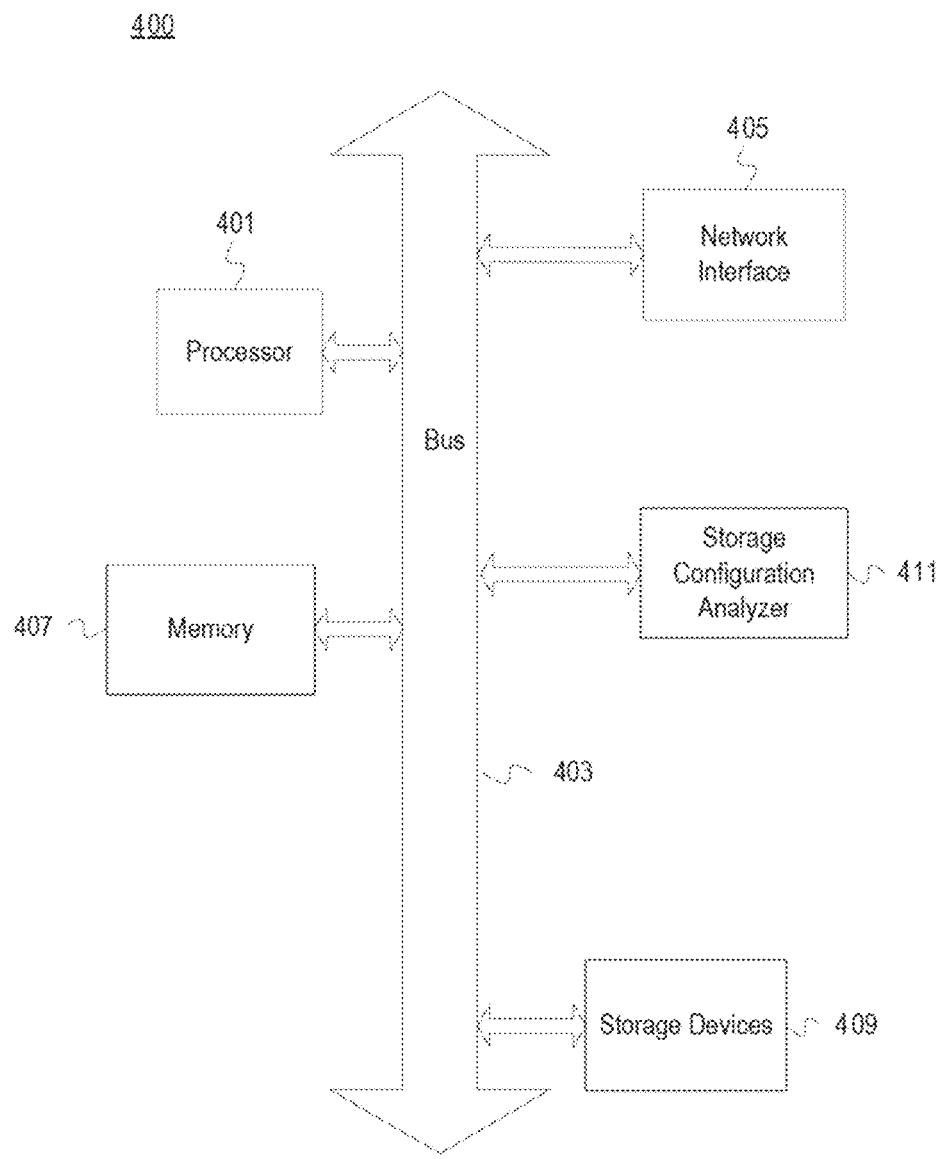
FIG. 4 depicts a computing system in accordance with an illustrative embodiment.

FIG. 4 depicts a computing system 400 in accordance with an illustrative embodiment. For example, the computing system 400 may represent a device, such as the wireless device 104 of FIG. 1. The computing device 400 may be utilized to receive user settings, instructions, or feedback for controlling the power management features of the wireless earpieces together and separately. The computing system 400 includes a processor unit 401 (possibly including multiple processors, multiple cores, multiple nodes, and/or implementing multi-threading, etc.). The computing system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM SONOS, PRAM, etc.) or any one or more of the above already described possible realizations of machine-readable media. The computing system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The system memory 407 embodies functionality to implement embodiments described above. The system memory 407 may include one or more functionalities that facilitate retrieval of the audio information associated with an identifier. Code may be implemented in any of the other devices of the computer system 400. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

The features, steps, and components of the illustrative embodiments may be combined in any number of ways and are not limited specifically to those described. In particular, the illustrative embodiments contemplate numerous variations in the smart devices and communications described. For example, the wireless earpieces may have any number of different form factors including as ear buds, behind-the-ear wireless earpieces, as a pan of a headset, or otherwise. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for managing power utilized by a pair of wireless earpieces, comprising:
   determining ambient light conditions and noise levels in an environment of the pair of wireless earpieces;
   determining by the pair of wireless earpieces whether the ambient light conditions are below a light threshold;
   determining by the pair of wireless earpieces whether the noise levels are below a noise threshold; and
   activating low power settings for the pair of wireless if conditions are below the light threshold or the noise levels are below the noise threshold.

2. The method of claim 1, wherein the light threshold indicates that the environment includes low light.

3. The method of claim 1, wherein the noise threshold indicates that the environment is low noise.

4. The method of claim 1, wherein the ambient light conditions are determined by one or more photodetectors of the pair of wireless earpieces.

5. The method of claim 1, wherein the noise levels are determined by one or more microphones of the pair of wireless earpieces.

6. The method of claim 1, wherein the light threshold and the noise threshold are set by a user.

7. The method of claim 1, wherein the pair of wireless earpieces communicate with a wireless device to receive the ambient light conditions.

8. The method of claim 1, further comprising:
   training the wireless earpieces to determine the light threshold and the noise threshold.

9. The method of claim 1, further comprising:
   activating full power settings in response to the ambient light conditions and the noise levels being above the light thresholds and the noise thresholds, respectively.

10. The method of claim 1, further comprising:
    activating a full power settings in response to user input to activate the full power settings.

11. The method of claim 1, wherein the ambient light conditions and the noise levels are determined for each of the pair of wireless earpieces separately, and wherein each of the pair of wireless earpieces that is below the light threshold or the noise threshold utilizes the low power settings.

12. The method of claim 1, wherein a speaker output is decreased in response to activating the low power settings.

13. A wireless earpiece, comprising:
    a frame for fitting in an ear of a user;
    a logic engine controlling functionality of the wireless earpiece;
    a speaker in communication with the logic engine communicating audio signals to the user;
    a plurality of sensors sensing ambient light conditions and noise levels in an environment of the wireless earpiece;
    a transceiver communicating with at least a wireless device;
    wherein the logic engine determines ambient light conditions and noise levels in an environment of the pair of wireless earpieces, determines whether the ambient light conditions are below a light threshold, determines whether the noise levels are below a noise threshold, and activates a low power setting for the wireless earpieces if the conditions are below the light threshold or the noise levels are below the noise threshold.

14. The wireless earpiece of claim 13, wherein the plurality of sensors include at least one photodetector for detecting one or more signal thresholds are determined utilizing the plurality of sensors of the wireless earpiece to determine whether the pair of wireless earpieces are being worn by the user.

15. The wireless earpiece of claim 13, wherein a volume of the speaker is decreased in response to activating the low power settings.

16. The wireless earpiece of claim 13, wherein the light threshold and the noise threshold are set by a user.

17. The wireless earpiece of claim 13, wherein the logic engine activates full power settings in response to the ambient light conditions and the noise levels being above the light thresholds and the noise thresholds, respectively.

18. The wireless earpiece of claim 13, wherein the logic engine trains the wireless earpieces to determine the light threshold and the noise threshold.

19. A wireless earpiece comprising:
  a processor for executing a set of instructions; and
  a memory for storing the set of instructions, wherein the set of instructions are executed to:
    determine ambient light conditions in an environment of the wireless earpiece;
    determine and noise levels in the environment of the wireless earpiece;
    activate low power settings for the wireless earpiece in response to determining the ambient light conditions are below a light threshold;
    activate low power settings for the wireless earpiece in response to determining the noise levels are below a noise threshold;
    wherein a volume of a speaker is decreased in response to activating the low power settings;
    wherein the light threshold and the noise threshold are set by a user.

20. The wireless earpieces of claim 19, wherein the set of instructions are further executed to:
  activate the full power settings in response to the ambient light conditions and the noise levels being above the light thresholds and the noise thresholds, respectively.

* * * * *